(No Model.)  2 Sheets—Sheet 1.

J. C. MERRELL.
PHOTOGRAPHIC CAMERA.

No. 254,997.  Patented Mar. 14, 1882.

Attest.
John H. Hopkins
C. F. Jackson

Inventor.
Jay C. Merrell
W. R. C. Osgood
atty (No Model.) 2 Sheets—Sheet 2.
J. C. MERRELL.
PHOTOGRAPHIC CAMERA.
No. 254,997. Patented Mar. 14, 1882.
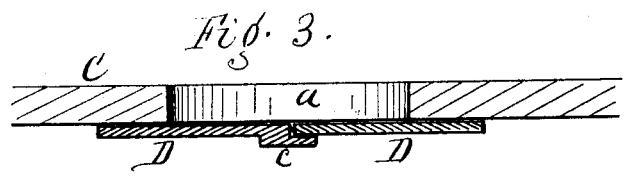
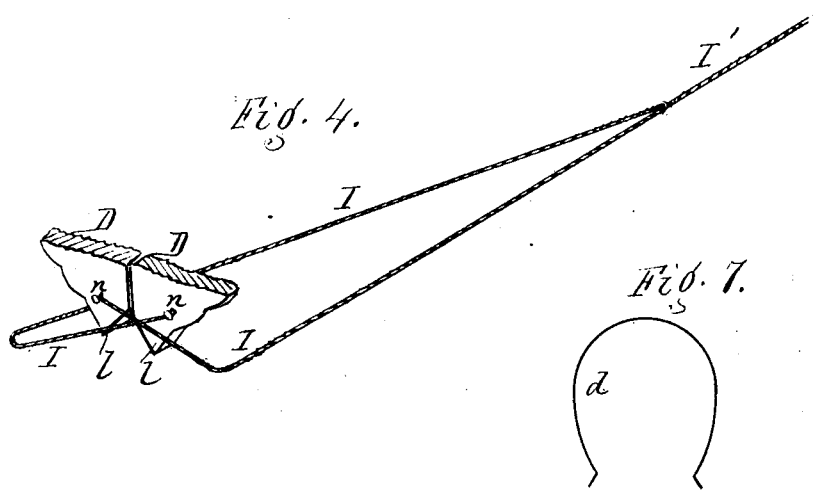
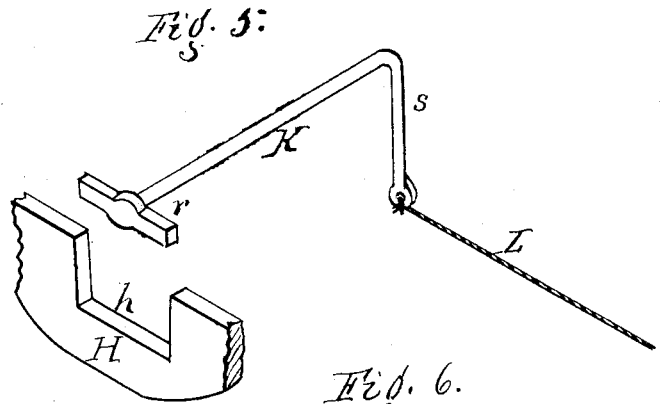
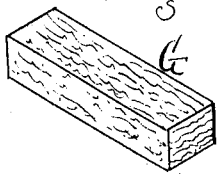
Attest.
John H. Hopkins
C. F. Sweeter
Inventor.
Jay C. Merrell
per R. L. Osgood,
atty

UNITED STATES PATENT OFFICE.

JAY C. MERRELL, OF GENESEO, NEW YORK.

PHOTOGRAPHIC CAMERA.

SPECIFICATION forming part of Letters Patent No. 254,997, dated March 14, 1882.

Application filed December 19, 1881. (No model.)

*To all whom it may concern:*

Be it known that I, JAY C. MERRELL, of Geneseo, Livingston county, New York, have invented a certain new and useful Improvement in Photographic Cameras; and I do hereby declare that the following is a full, clear, and exact description of the same, reference being had to the accompanying drawings, in which—

Figure 1:
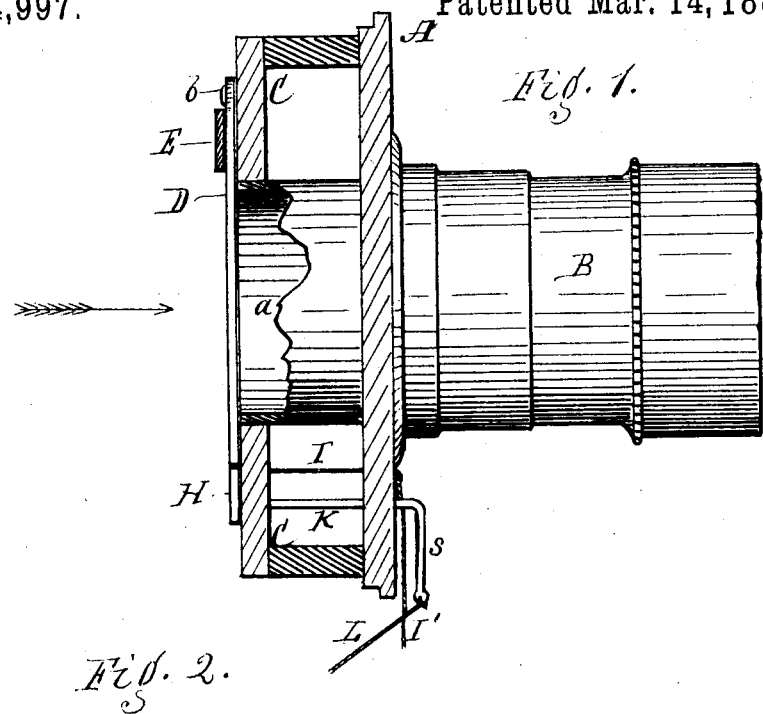
Figure 2:
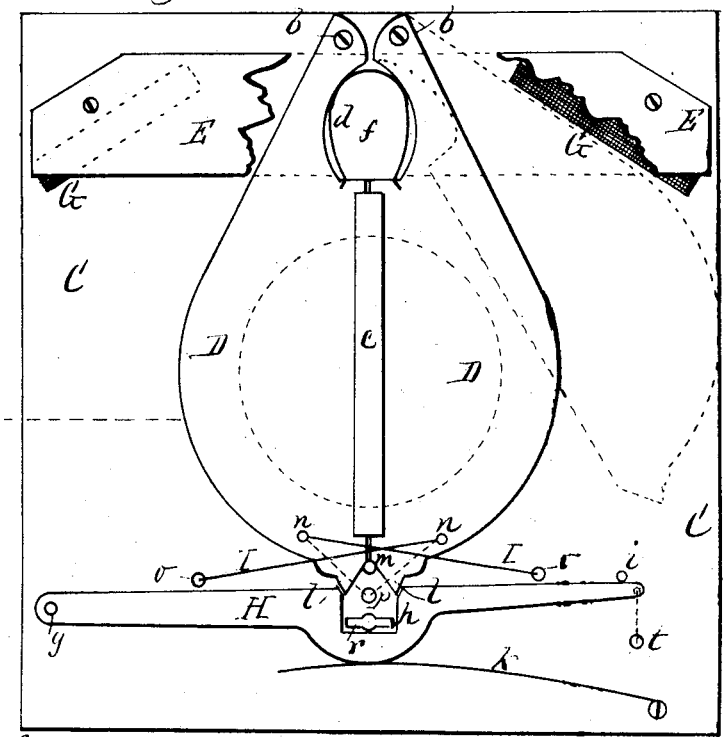

Figure 1 is a vertical section of the movable front of a camera proper, to which the lens-tube is always fastened, showing said tube in position, and also showing my attachment. Fig. 2 is an elevation of the operating parts, looking in the direction of the arrow, Fig. 1. Fig. 3 is a horizontal section in line $x\ x$ of Fig. 2. Fig. 4 is a perspective view of the lower ends of the pivoted slides and the cords for operating them. Fig. 5 is a perspective view of the device for operating the spring-catch. Fig. 6 is a perspective view of one of the cushions for breaking the shock of the slides. Fig. 7 is a view of the spring for throwing the slides apart.

My improvement is for use in connection with photographic cameras; and it consists of a device for dispensing with the camera-cloth as used for covering and uncovering the lens-tube, said device performing the operation of closing and unclosing the lens-tube in a more effective manner.

The invention consists in the construction and arrangement hereinafter described.

A indicates the removable front of the camera proper. B is the lens-tube, and C is a plate forming an inside attachment, made of either wood or metal, but preferably of wood, and of similar shape to the movable front. It is connected with the front piece at a proper distance to insure correct working of the parts. The attachment C has an opening, $a$, in its center to admit the rear end of the lens-tube.

My improvement is as follows:

D D are two slides which cover the opening in the attachment C, made for the end of the lens-tube. These slides are preferably made of wood, but may be of other material, and are hung upon screws or pivots $b\ b$ at the top. The screws are placed as close together as is consistent with the proper working of the slides. The slides move upon the flat surface of the attachment and meet centrally over the opening, where they are centered by striking a stud, $m$. One of the slides has a flap, $c$, which strikes past and overlaps the edge of the other slide, as shown in Fig. 3, whereby the light is totally excluded from the camera.

$d$ is a spring resting in an opening, $f$, between the upper ends of the slides, and serving to throw them apart and away from the opening which they cover. This spring may be of any desired form, but preferably of the flat or watch-spring shape shown in Fig. 7.

E is a cross-piece resting over the upper ends of the slides, forming a guide for them, keeping the spring in place, and also furnishing pockets for the cushions G G, against which the slides strike as they are thrown open, thereby preventing shocks and noise which would attract the attention of the sitter. The cushion may be made of any suitable material, but preferably of cotton or some other soft fiber. In Fig. 2 the cross-piece is shown partially broken away to exhibit the slides, spring, and cushions.

H is a spring-catch, located below the slides, pivoted at $g$ at one end and having a free movement at the other. In the center is a square notch, $h$. The catch is thrown up against a stop, $i$, by a spring, $k$, of any suitable kind. On the bottom of the slides D D are V-shaped lugs $l\ l$, which, when the slides are closed together, act as cams to press the catch H downward, and the lugs then fall into the notch and hold the slides closed against the stud $m$.

I I are two cords, attached respectively to the two slides at $n\ n$, thence crossing each other and passing out through holes $o\ o$ to the outside of the camera, where they unite in a single cord, I', in convenient position to the hand of the operator. If desired, the two cords I I may be passed through a hole, $p$, instead of crossing each other and passing through separate holes.

K is a shaft, having a cross-head, $r$, which rests in the bottom of the square notch $h$, the shaft extending out through the front of the camera, and having a bent end, $s$, turning downward, to which is attached a cord, L, in convenient position for the operator.

The operation will be readily understood. By drawing upon the cord I' the slides will be closed and held by the catch H and the light will be cut off from the camera. By drawing upon the cord L the catch H will be depressed, releasing the slides, and the latter will fly open. The catch might be depressed by a cord attached to its end; but the shaft and cross-head are more effective. By this means the slides are perfectly under control and can be operated without attracting the attention of the sitter, which is a matter of much importance, especially in taking the pictures of children, who are liable to change position or turn the eyes to see any movement that may be made.

It has been found by practice that slides moving in plane or parallel to the negative or plate upon which the picture is being made, and directly in contact with the attachment C, obviates the objection of having a commotion in the camera caused by swinging shutters, which fan particles of dust on the sensitive plate and produce specks upon the picture. The screws $b$ $b$ should be placed as close together as possible, allowing the slides the necessary movement.

This invention is designed to furnish a new, cheap, and effective means for controlling the exposure in photographic cameras, and is applicable to old as well as new cameras.

Having thus described my invention, I claim—

1. The combination, in a camera, of the pivoted slides D D, provided with the lugs $l$ $l$, the spring $d$, resting between the slides and serving to throw them apart, the pivoted spring-catch H, provided with the square notch $h$, with which the lugs engage, the cords I I I', attached to the slides and extending out through the case, and the shaft K, provided with the cross-head $r$, resting in the notch $h$ and operated by the cord L, as shown and described, and for the purpose specified.

2. The combination, with the pivoted slides D D, of the cross-piece E, extending over the slides and forming guides thereto, and the cushions G G, of cotton or equivalent material, under the cross-piece, as herein shown and described.

3. The combination of the slides D D, pivoted at their tops and having an opening, $f$, between them, the cords I I, attached to the bottom of the slides for operating them, and the spring $d$, placed loosely between the slides in the opening $f$, and serving to open the slides when released by the cords, as herein shown and described.

In witness whereof I have hereunto signed my name in the presence of two subscribing witnesses.

JAY C. MERRELL.

Witnesses:
A. J. ABBOTT,
JOHN RORBACH.